United States Patent
Venkatasubramanian et al.

(10) Patent No.: US 10,387,442 B2
(45) Date of Patent: Aug. 20, 2019

(54) CONNECTED SPACE

(71) Applicant: SAP SE, Walldorf (DE)

(72) Inventors: Ramshankar Venkatasubramanian, Santa Clara, CA (US); Dirk Wodtke, Aptos, CA (US); Ramprasad Rai, Palo Alto, CA (US); Brendan Bowles, Santa Clara, CA (US)

(73) Assignee: SAP SE, Walldorf (DE)

( * ) Notice: Subject to any disclaimer, the term of this patent is extended or adjusted under 35 U.S.C. 154(b) by 176 days.

(21) Appl. No.: 15/437,831

(22) Filed: Feb. 21, 2017

(65) Prior Publication Data

US 2018/0239804 A1   Aug. 23, 2018

(51) Int. Cl.

| G06F 7/00 | (2006.01) |
|---|---|
| G06F 17/00 | (2019.01) |
| G06F 16/25 | (2019.01) |
| G06F 16/28 | (2019.01) |
| G06Q 10/00 | (2012.01) |
| G06Q 10/06 | (2012.01) |
| G06Q 10/08 | (2012.01) |

(52) U.S. Cl.
CPC .......... *G06F 16/254* (2019.01); *G06F 16/288* (2019.01); *G06Q 10/00* (2013.01); *G06Q 10/063* (2013.01); *G06Q 10/0833* (2013.01)

(58) Field of Classification Search
None
See application file for complete search history.

(56) References Cited

U.S. PATENT DOCUMENTS

| 2011/0125659 A1* | 5/2011 | Bernard | G06Q 10/00 705/319 |
|---|---|---|---|
| 2013/0321791 A1* | 12/2013 | Feldkhun | G01B 11/2518 356/4.01 |
| 2014/0009284 A1* | 1/2014 | Slavin | G08B 13/2402 340/539.13 |
| 2015/0003670 A1* | 1/2015 | Kuehnle | G06K 9/00805 382/103 |
| 2015/0105934 A1* | 4/2015 | Palmer | G07C 5/0841 701/1 |

FOREIGN PATENT DOCUMENTS

| WO | 2007/052285 A2 | 5/2007 |
|---|---|---|
| WO | 2014000791 | * 6/2012 |
| WO | 2017027981 | * 8/2015 |

OTHER PUBLICATIONS

"Communication: The Extended European Search Report", Mar. 15, 2018 (Mar. 15, 2018), European Patent Office, for European Patent Application No. 17001924.4-1222, 9pgs.

* cited by examiner

*Primary Examiner* — Tuan A Pham
(74) *Attorney, Agent, or Firm* — Buckley, Maschoff & Talwalkar LLC (57) ABSTRACT

A system includes determination of a first measure value associated with a first physical space and a first time period within the analytical data, dynamic determination of a time-dependent association between a first entity or event and the first physical, dynamic mapping of the first measure value to the first entity or event based on the time-dependent association, and presentation of the first measure value in association with the first entity or event.

20 Claims, 12 Drawing Sheets

| ThingID | ThingName | SizeMetersSq | SpaceID | SpaceName | SpaceType | TimeBucketId | DwellTime |
|---|---|---|---|---|---|---|---|
| 1 | StoreFront | 25 | A | RetailMart | Public | 200 | 1000 |

CONNECTED SPACE

BACKGROUND

Enterprise software systems receive, generate, and store analytical data related to enterprise transactions. Some of this analytical data may include data generated by sensors in response to activities occurring within disparate physical spaces. The volume of this "spatial" data is increasing rapidly as the Internet-of-Things becomes more prevalent.

Users operate software tools to access analytical data and display the data in useful formats, such as in graphic visualizations. Visualizations may facilitate the detection of patterns within the data and the determination of insights from the data. However, it is difficult to analyze spatial data without relating the corresponding analytical spaces to particular enterprise entities or activities.

Conventional attempts to address the foregoing include complex functional programming and materialization of the results. What is needed is a system to dynamically view analytical data from a perspective different from those provided by the data model of the analytical data.

DETAILED DESCRIPTION

The following description is provided to enable any person in the art to make and use the described embodiments. Various modifications, however, will remain readily apparent to those in the art.

Figure 1:
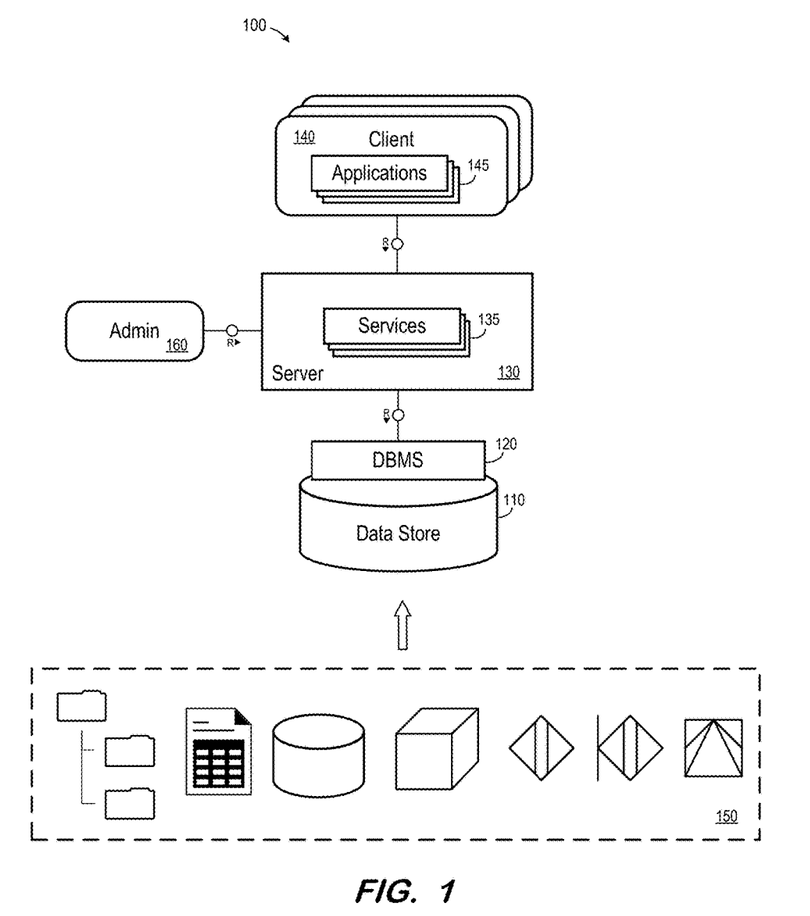
FIG. 1 is a block diagram of a system architecture according to some embodiments.

FIG. 1 is a block diagram of architecture 100 according to some embodiments. Embodiments are not limited to architecture 100 or to a database architecture.

Architecture 100 includes data store 110, database management system (DBMS) 120, server 130, services 135, clients 140, applications 145, data sources 150 and administration device 160. Generally, services 135 executing within server 130 receive requests from applications 145 executing on clients 140 and provides results to applications 145 based on data stored within data store 110.

More specifically, server 130 may execute and provide services 135 to applications 145. Services 135 may comprise server-side executable program code (e.g., compiled code, scripts, etc.) which provide functionality to applications 145 by providing user interfaces (e.g., in eXtended Markup Language (XML), HyperText Markup Language (HTML) and/or JavaScript) to clients 140, receiving requests from applications 145, retrieving data from data store 110 based on the requests, processing the data received from data store 110, and providing the processed data to applications 145. Services 135 may be made available for execution by server 130 via registration and/or other procedures which are known in the art.

In one specific example, a client 140 executes an application 145 to present a user interface to a user on a display of the client 140. The user operates the user interface to request certain data, and the application 145 passes a query based on the request to one of services 135. An SQL script is generated based on the query and forwarded to DBMS 120. DBMS 120 executes the SQL script to return a result set based on data of data store 110, and the application 145 generates and displays a report/visualization based on the result set.

The above operation may leverage a set of objects defined by metadata stored within data store 110 and/or a separate metadata repository (not shown). Each object associates one or more physical entities (e.g., a physical database table, associated columns of one or more database tables, etc.) of data store 110 with user-friendly names. These objects may be classified as dimensions, along which one may perform an analysis or report (e.g., Year, Country, Product), or measures (e.g., Sales, Profit), whose values can be determined for a given combination of dimension values. Accordingly, a query may include thusly-defined dimensions, dimension values and/or measures, and the metadata is used to execute the query with respect to the corresponding physical entities of data store 110.

Data sources 150 may comprise any sources of data which are or become known, including but not limited to database views, spreadsheets, relational databases, OnLine Analytical Processing cubes, proximity sensors, motion sensors, and light sensors. According to some embodiments, new data from data sources 150 are periodically loaded into data store 110. Each type of data source 150 may require a particular Extract, Transform and Load process in order to store its data within data store 110. According to some embodiments, metadata describing this newly-loaded data is incorporated into the above-described semantic layer such that the data may be queried as described above. This metadata may be generated automatically and/or with the assistance of an administrator operating administration device 160, as will be described below.

Server 130 provides any suitable protocol interfaces through which applications 145 executing on clients 140 may communicate with services 135 executing on application server 130. For example, server 130 may include a HyperText Transfer Protocol (HTTP) interface supporting a transient request/response protocol over Transmission Control Protocol (TCP), and/or a WebSocket interface supporting non-transient full-duplex communications between server 130 and any clients 140 which implement the WebSocket protocol over a single TCP connection.

One or more services 135 executing on server 130 may communicate with DBMS 120 using database management interfaces such as, but not limited to, Open Database Connectivity (ODBC) and Java Database Connectivity (JDBC) interfaces. These types of services 135 may use Structured Query Language (SQL) to manage and query data stored in data store 110.

DBMS 120 serves requests to query, retrieve, create, modify (update), and/or delete data of data store 110, and also performs administrative and management functions. Such functions may include snapshot and backup management, indexing, optimization, garbage collection, and/or any other database functions that are or become known. DBMS 120 may also provide application logic, such as database procedures and/or calculations, according to some embodiments. This application logic may comprise scripts, functional libraries and/or compiled program code.

Server 130 may be separated from or closely integrated with DBMS 120. A closely-integrated server 130 may enable execution of services 135 completely on the database platform, without the need for an additional server. For example, according to some embodiments, server 130 provides a comprehensive set of embedded services which provide end-to-end support for Web-based applications. The services may include a lightweight web server, configurable support for Open Data Protocol, server-side JavaScript execution and access to SQL and SQLScript.

Data store 110 may comprise any query-responsive data source or sources that are or become known, including but not limited to a structured-query language (SQL) relational database management system. Data store 110 may comprise a relational database, a multi-dimensional database, an eXtendable Markup Language (XML) document, or any other data storage system storing structured and/or unstructured data. The data of data store 110 may be distributed among several relational databases, dimensional databases, and/or other data sources. Embodiments are not limited to any number or types of data sources.

In some embodiments, the data of data store 110 may comprise one or more of conventional tabular data, row-based data, column-based data, and object-based data. Moreover, the data may be indexed and/or selectively replicated in an index to allow fast searching and retrieval thereof. Data store 110 may support multi-tenancy to separately support multiple unrelated clients by providing multiple logical database systems which are programmatically isolated from one another.

Data store 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each of clients 140 may comprise one or more devices executing program code of an application 145 for presenting user interfaces to allow interaction with application server 130. The user interfaces of applications 145 may comprise user interfaces suited for reporting, data analysis, and/or any other functions based on the data of data store 110.

Administration device 160 may also comprise one or more devices executing program code for presenting interfaces to allow interaction with application server 130. Such interaction may comprise database administration, backup and maintenance, as well as modification or supplementation of semantic layer metadata and/or other metadata describing the data of data store 110.

Presentation of a user interface as described herein may comprise any system to render visualizations. For example, a client 140 may execute a Web Browser to request and receive a Web page (e.g., in HTML format) from application server 130 via HTTP, HTTPS, and/or WebSocket, and may render and present the Web page according to known protocols. In another example, an application 145 may comprise a user interface component and an engine component. The user interface component transmits JavaScript calls to the engine component in response to user interactions and the engine component transmits corresponding HTTP calls to server 130. The engine component receives XML, HTML and/or JavaScript from server 130 in response, and provides corresponding HTML and custom style sheet (CSS) data to the user interface component for rendering thereby. Such an implementation may allow data exchange and presentation without requiring full page reloads.

Figure 2:
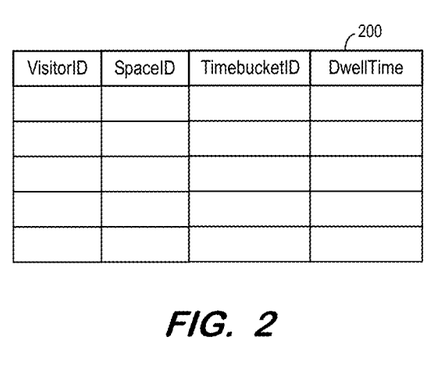
FIG. 2 is a tabular representation of a portion of a database table according to some embodiments.

FIG. 2 is a tabular representation of database table 200 of data store 110 according to some embodiments. Database table 200 includes data associated with the movement of people (i.e., specified by VisitorID) within physical spaces (i.e., specified by SpaceID). The data of database table 200 may be based on raw data collected via sensors, cameras, other devices, and/or manually, which is then transformed and combined with data defining physical spaces. The resulting data of database table 200 may support user queries thereof.

The column TimebucketID of table 200 indicates a period of time indexed by the TimebucketID in a separate table. The DwellTime column indicates an amount of time spent at a particular place (i.e., SpaceID) by a particular person (i.e., VisitorID) within a given time period (i.e., TimeBucketID). Table 200 may therefore also be used to determine how many people were in a particular space during a particular period of time. Embodiments are not limited to the DwellTime measure or to the particular columns of table 200.

Table 200 does not provide any semantics regarding the spaces associated with the SpaceIDs. These semantics may include the nature of the space itself (e.g., mall, store, office, sports venue, etc.) and/or the nature of the activity occurring within the space (e.g., demonstration, meeting, sale, sporting event, etc.). It is desirable to dynamically and efficiently slice and dice the data of table 200 using such semantic information.

Figure 3:
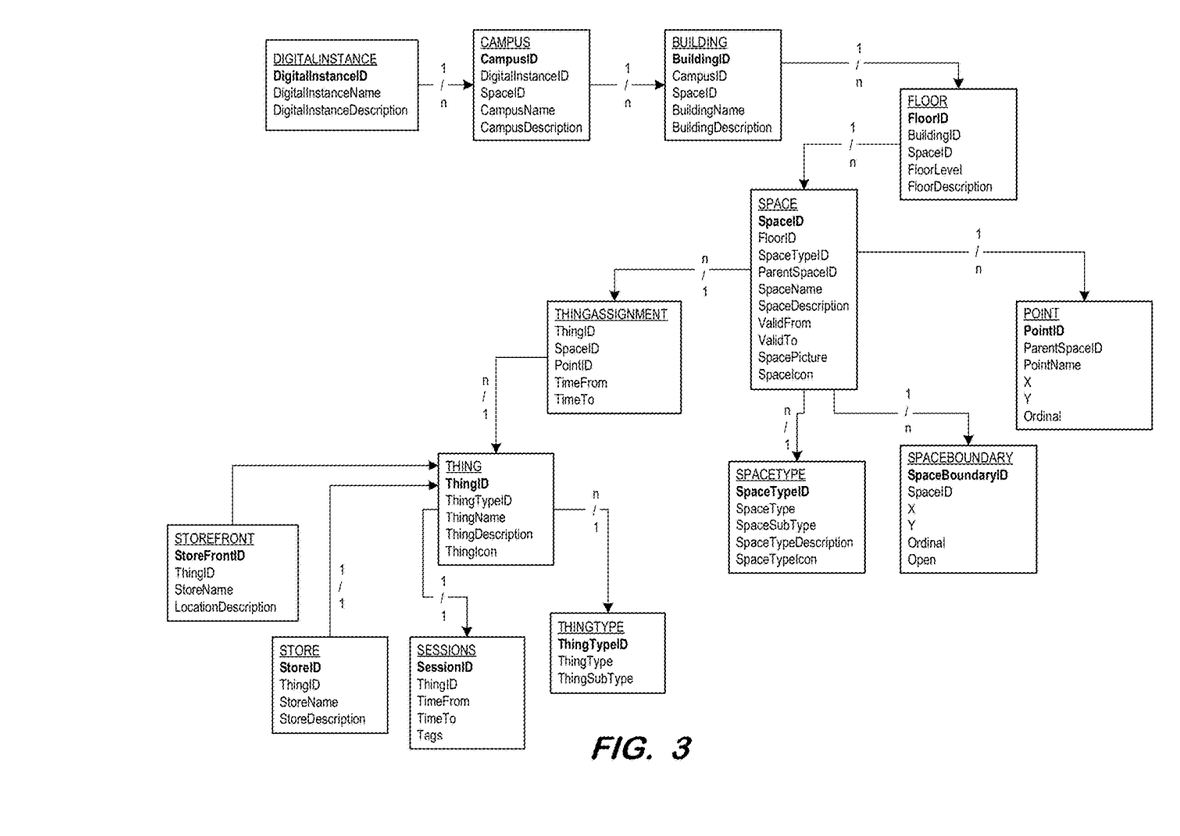
FIG. 3 illustrates a data model according to some embodiments.

FIG. 3 is a data model or a design time representation of masterdata metadata according to some embodiments. The data model captures characteristics of spaces and relationships therebetween. The FIG. 3 data model also relates 'things' to spaces, as will be described below. Some embodiments incorporate such 'things' into analytical views (e.g., table 200) which do not include the 'thing' dimension so that the views may be manipulated (e.g., drill-down, drill-up, slice and dice) based on thing dimension values.

Referring to the individual metadata objects of the FIG. 3 data model, a digital instance is an application instance of digital space, and an umbrella for all objects of the space-related data model. A campus is a collection of buildings in a location, and a building may describe a room or an enclosed area. One or more buildings may be located inside another building, and a building may include one or more floors.

A space is an area defined by a SpaceID, FloorID, SpaceTypeID, ParentSpaceID, SpaceName, SpaceDescription, validity period (i.e., ValidFrom and ValidTo), SpacePicture and SpaceIcon. A space may be located inside another space. SpaceTypes may include meeting rooms, cafeterias, floors, etc., and corresponding SpaceSubTypes may include large meeting room, Indian food, retail, etc. SpaceBoundary and Point objects define physical locations of spaces.

A thing object may specify an entity (e.g., a display, a product, a store) within a space and/or an event occurring within a space. A ThingType may be active (e.g., an iBeacon/WiFi-AP/Camera), passive (e.g., an RFID tag), or other (e.g., an event).

According to the illustrated embodiment, the Thing object is related to the Space object via a temporal association specified by a ThingAssignment object. For instance, the ThingAssignment object may specify that an event (associated with a particular ThingID) was hosted from 10 am (i.e., TimeFrom) to 11 pm (i.e., TimeTo) in a space (associated with a particular SpaceID). Moreover, the ThingAssignment object may associate the particular SpaceID with a second ThingID that is in turn associated with a store via the Store object. The ThingAssignment object may, for example, indicate that a store was located in the space from May 2011 to June 2016. The Store object includes attributes such as a store name and store description.

Figure 4:
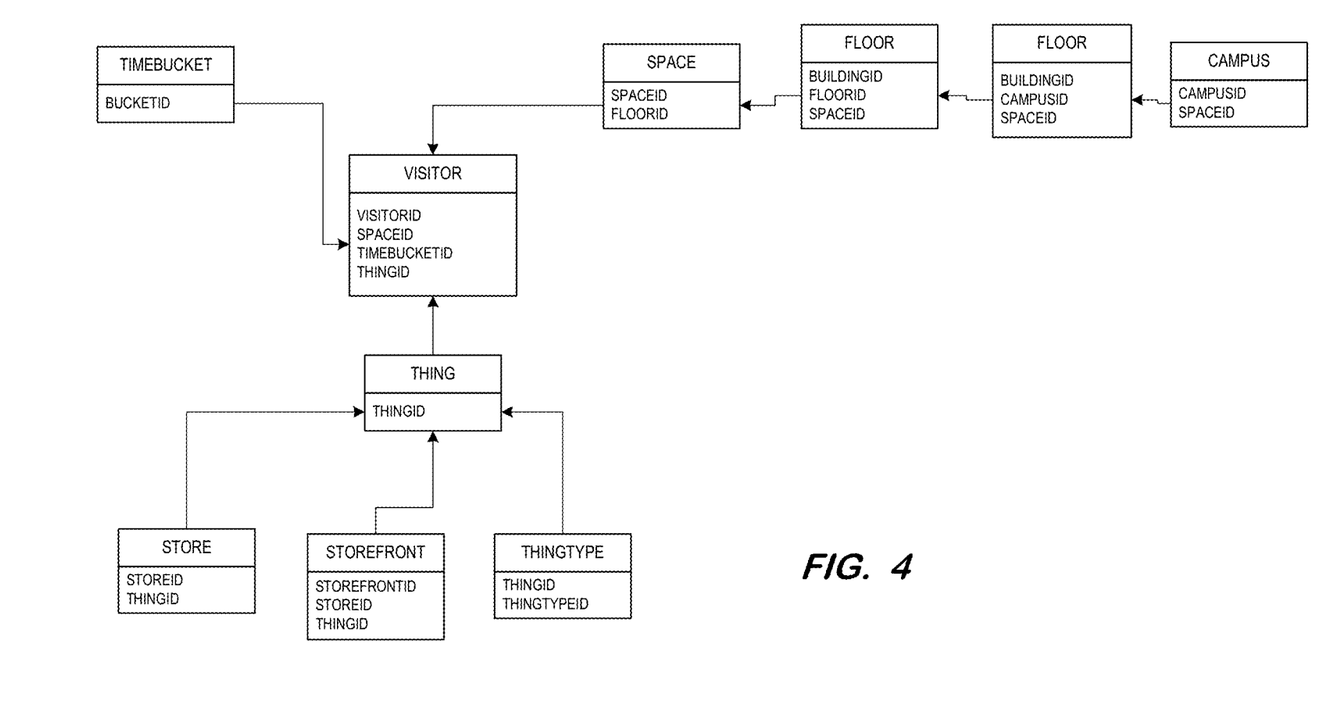
FIG. 4 illustrates a view model according to some embodiments.

As mentioned above, table 200 does not include the 'thing' dimension. Despite this architecture, some embodiments operate to dynamically generate a view as illustrated in FIG. 4. The Visitor table (e.g., table 200) contains the key figures and the surrounding tables represent dimensions through which the key figures may be analyzed. Notably, the Visitor table contains 'ThingID', which is missing from the table 200. Due to the presence of ThingID, the key figures may also be analyzed with respect to the objects and attributes associated with ThingID by the masterdata metadata (e.g., store name, store description).

Figure 5:
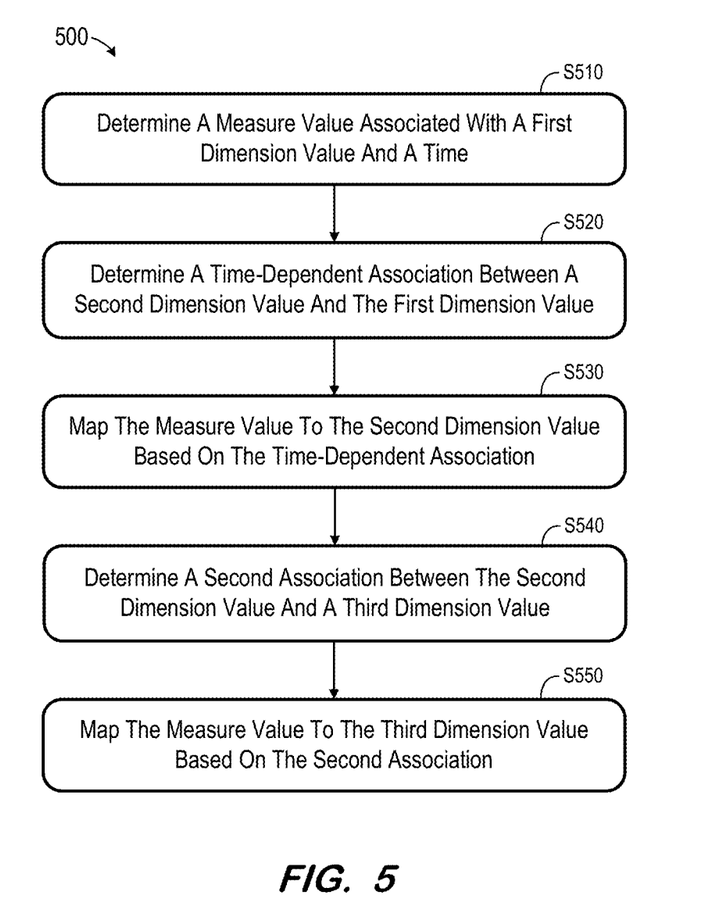
FIG. 5 is a flow diagram of a process according to some embodiments.

FIG. 5 comprises a flow diagram of process 500 according to some embodiments. Process 500 may be executed to dynamically project data at the space level (e.g., the DwellTime data of table 200) to 'Things' which were present in corresponding spaces at corresponding times. Process 500 therefore determines the time-dependent, logical relationship between things and spaces.

In some embodiments, various hardware elements of system 100 execute program code to perform process 500. Process 500 and all other processes mentioned herein may be embodied in computer-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Figure 6:
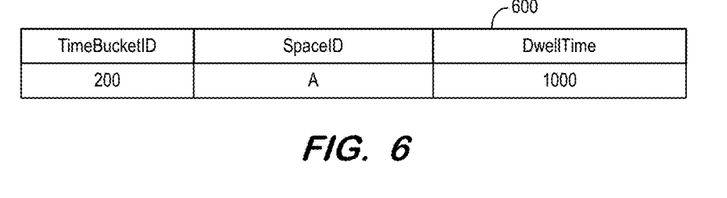
FIG. 6 is a tabular representation of measure data according to some embodiments.

Initially, at S510, a measure value associated with a first dimension value and a time is determined. According to the present example, the first dimension value is a value of the space dimension and the measure value is a value to be projected to a thing present within the space at the time. FIG. 6 illustrates table row 600 including a measure value (i.e., value '1000' of the DwellTime measure) and an associated first dimension value (i.e., value 'A' of the SpaceID dimension) and time (TimeBucketID '200'). Table row 600 may comprise analytical data collected during enterprise operation according to an analytical data model.

Next, at S520, a time-dependent association is determined between the first dimension value and the second dimension value. An example of S520 will be provided with respect to masterdata tables 710, 720 and 730 of FIG. 7. As shown in ThingAssignment table 720, ThingID "1" is assigned to Space ID "A" for the entirety of year 2016. A record of a ThingAssignment table may be input by a user or administrator, to provide an additional perspective by which to analyze analytical data according to some embodiments. Table 730 defines TimeBucketIDs 1 to 365, which evenly split the year 2016 into 1 day intervals. Consequently, as illustrated in resulting ThingAssignment table 740, ThingID "1" is assigned to space "A" for TimeBucketIDs 1 to 365.

Figure 7:
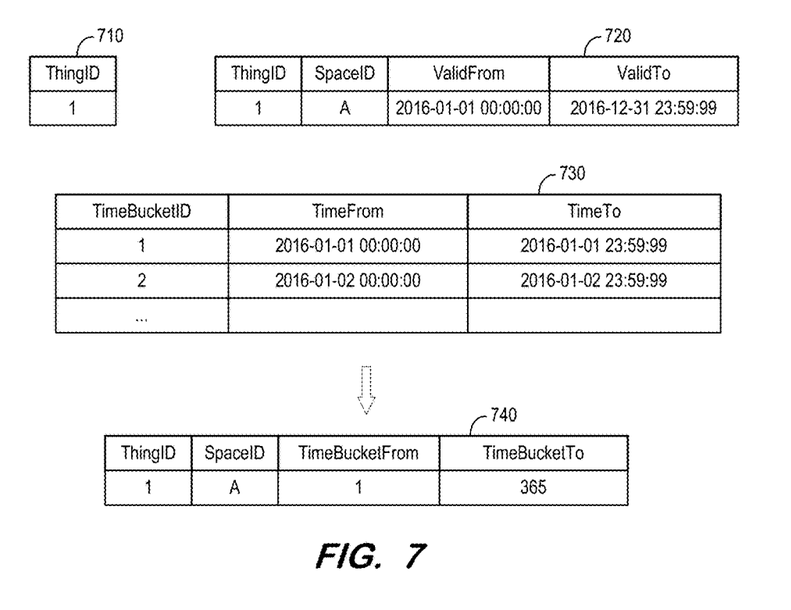
FIG. 7 includes tabular representations of portions of three masterdata tables according to some embodiments.

According to some embodiments, S520 is executed on-the-fly by server 130 and/or DBMS 120 using SQL operations. The foregoing is one example of an SQL statement to determine table 740 from tables 710-730 at S520 according to some embodiments:

SELECT THINGID, SPACEID, MIN(TIMEBUCKETID), MAX(TIMEBUCKETID)
FROM
(
  SELECT TH.THINGID, TA. SPACEID, TB.TIME-BUCKETID
FROM
THING as TH INNER JOIN THINGASSIGNMENT TA on TH.THINGID=TA.THINGID
LEFT OUTER JOIN TIMEBUCKETS TB on (TA.VALIDFROM>=TB.TIMEFROM AND TA.VALIDTO<=TB.TIMETO)
GROUP BY TH.THINGID, TA. SPACEID
)
GROUP BY THINGID, SPACEID The measure value of S510 is mapped to the second dimension value based on the determined time-dependent association at S530. According to some embodiments, the integer time bucket values generated at S520 are used to assign the measure value, stored at the space and time-bucket level, to a Thing. With respect to the present example, DwellTime 1000 of table 600 is mapped to a Thing based on table 740.

The mapping may proceed by noting that the TimeBucketID '200' associated with measure value '1000' lies within the range of TimeBucketIDs 1 to 365. According to table 740, ThingID '1' is associated with SpaceID 'A' (i.e., the first dimension value) during all TimeBucketIDs lying within the range of TimeBucketIDs 1 to 365. Therefore, the measure value '1000' is mapped to ThingID '1' at S530, as shown by table 800 of FIG. 8.

An example of an SQL statement to map the measure value at S530 according to some embodiments:

WITH THINGASSIGNMENT AS
(
SELECT THINGID , SPACEID , MIN(TIMEBUCKETID) AS MINTIMEBUCKET , MAX(TIMEBUCKETID) AS MAXTIMEBUCKET
FROM

```
(
    SELECT TH.THINGID , TA.SPACEID, TB.TIMEBUCKETID
FROM
THING as TH INNER JOIN THINGASSIGNMENT TA on TH.THINGID = TA.THINGID
LEFT OUTER JOIN TIMEBUCKETS TB on (TA.VALIDFROM >= TB.TIMEFROM AND
    TA.VALIDTO <= TB.TIMETO)
GROUP BY TH.THINGID , TA.SPACEID
)
GROUP BY THINGID, SPACEID
)
SELECT THINGASSIGNMENT.THINGID , KPIDATA.SPACEID,
    KPIDATA.TIMEBUCKETID , KPIDATA.KPI
FROM KPIDATA INNER OUTER JOIN
THINGASSIGNMENT ON KPIDATA.SPACEID = THINGASSIGNMENT.SPACE
WHERE KPIDATA.TIMEBUCKETID BETWEEN
    THINGASSIGNMENT.MINTIMEBUCKET and
    THINGASSIGNMENT.MAXTIMEBUCKET
```

The present example includes only one space assignment for ThingID '1', and only one Thing assignment for SpaceID 'A'. Embodiments are not limited to either of these scenarios. According to some embodiments, the ThingAssignment determination of S520 and the mapping at S530 are performed at runtime and are not materialized in advance. These features advantageously reduce additional programming and storage required to provide an additional (e.g., 'Thing') perspective to the analytical data. In this regard, no concept of the additional perspective exists in the analytical data model prior to its introduction according to the embodiments described herein.

Figure 8:
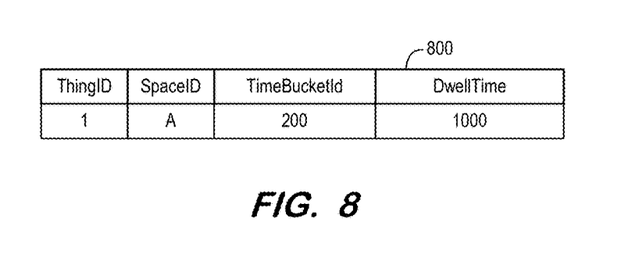
FIG. 8 is a tabular representation of joined data according to some embodiments.

S540 and S550 concern additional enrichment of the measure value according to some embodiments. For example, once a thing has been assigned to a space/time (e.g., by means of ThingAssignment table 740) and mapped to measure values (e.g., table 800), the mapping may be extended to additional attributes associated with the thing (e.g., via Store and StoreFront tables defined by the FIG. 3 masterdata). Such extensions may further enrich the reporting model and may lead to more valuable and interesting measure reporting.

Figure 9:
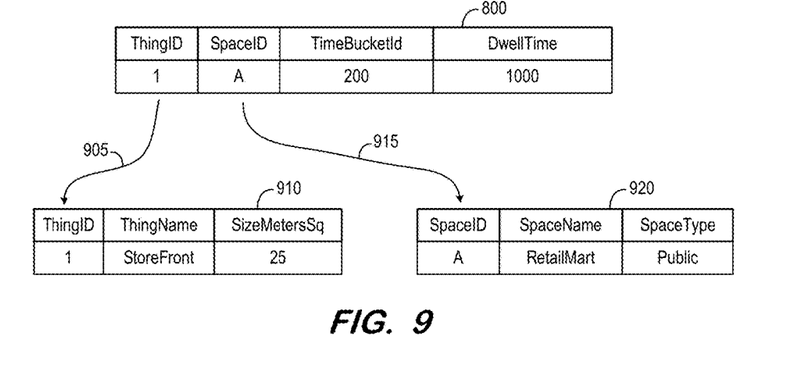
FIG. 9 illustrates mapping of joined data to additional attributes according to some embodiments.
Figure 10:
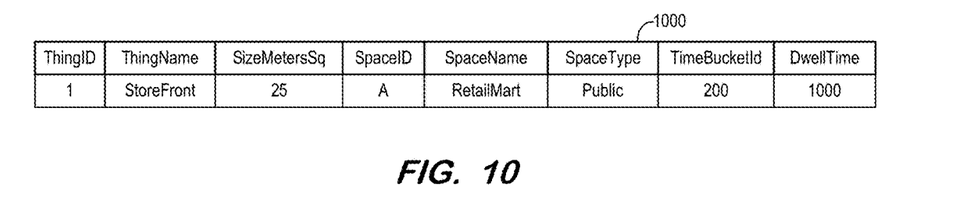
FIG. 10 illustrates enriched joined data according to some embodiments.

FIGS. 9 and 10 illustrate such an extended mapping according to some embodiments. At S540, a second association (e.g., arrow 905) is determined between the second dimension value (e.g., ThingID '1' of table 800) and a third dimension value (e.g., ThingName 'StoreFront', or SizeMeterSq '25' of record 910 of a Thing table) as defined by the FIG. 3 masterdata. Similarly, an association (e.g., arrow 915) may be determined between the first dimension value (e.g., SpaceID 'A' of table 800) and a fourth dimension value (e.g., SpaceName 'RetailMart', or SpaceType 'Public' of record 920 of a Space table) as defined by the FIG. 3 masterdata.

The second association, and any other associations determined at S540, may be used to map the original measure value to the associated dimension values at S550. For example, result record 1000 associates DwellTime value '1000' with the storefront of RetailMart during TimeBucketId 200. Record may also be used to calculate a measure value per square meter of (1000/25)=40 during TimeBucketID 200.

Figure 11:
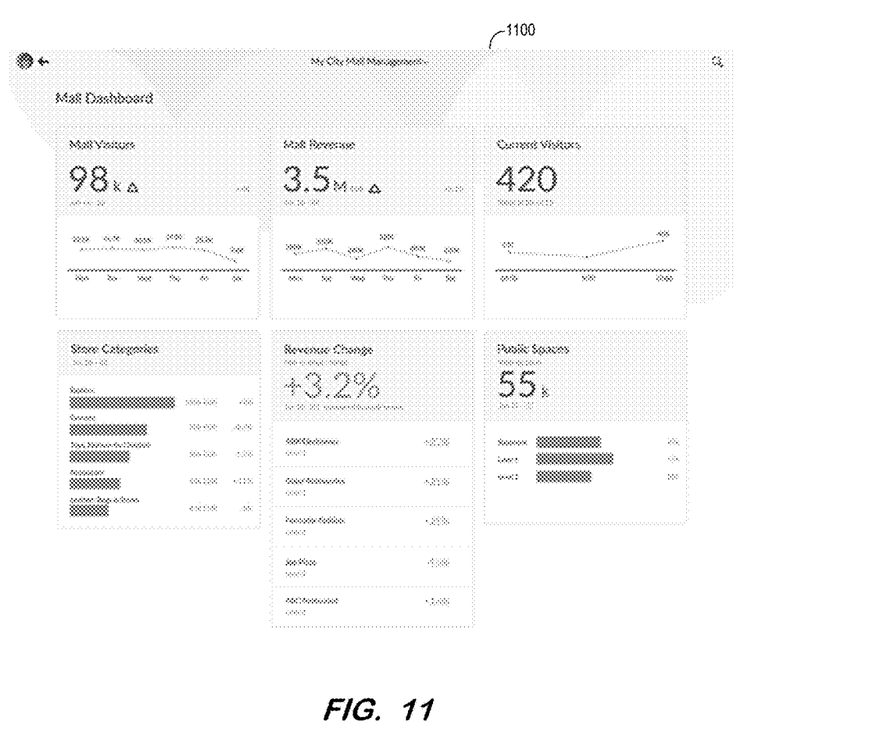
FIG. 11 is an outward view of a user interface according to some embodiments.

FIG. 11 illustrates interface 1100 according to some embodiments. Embodiments are not limited to interface 1100. Interface 1100 may comprise a Web page provided by server 130 in response to a request from a Web browser application 145 executing on client 140. Any client application 145 may be used to display interface 1100, which is not limited to Web-based formats.

Interface 1100 presents visualizations of various measure values, and of values calculated based thereon (e.g., net change), with respect to various combinations of dimension values according to some embodiments. According to the example, a thing of type "Mall" is created and is associated with space(s) at the top of the space hierarchy (e.g., via a ThingAssignment object conforming to the masterdata data model of FIG. 3). Measure values that are associated with lower level spaces, e.g. stores within the mall, may be rolled up to the parent space and attributed to the "Mall" thing as described above, even though those values are not associated with the Mall thing in the analytical data.

Figure 12:
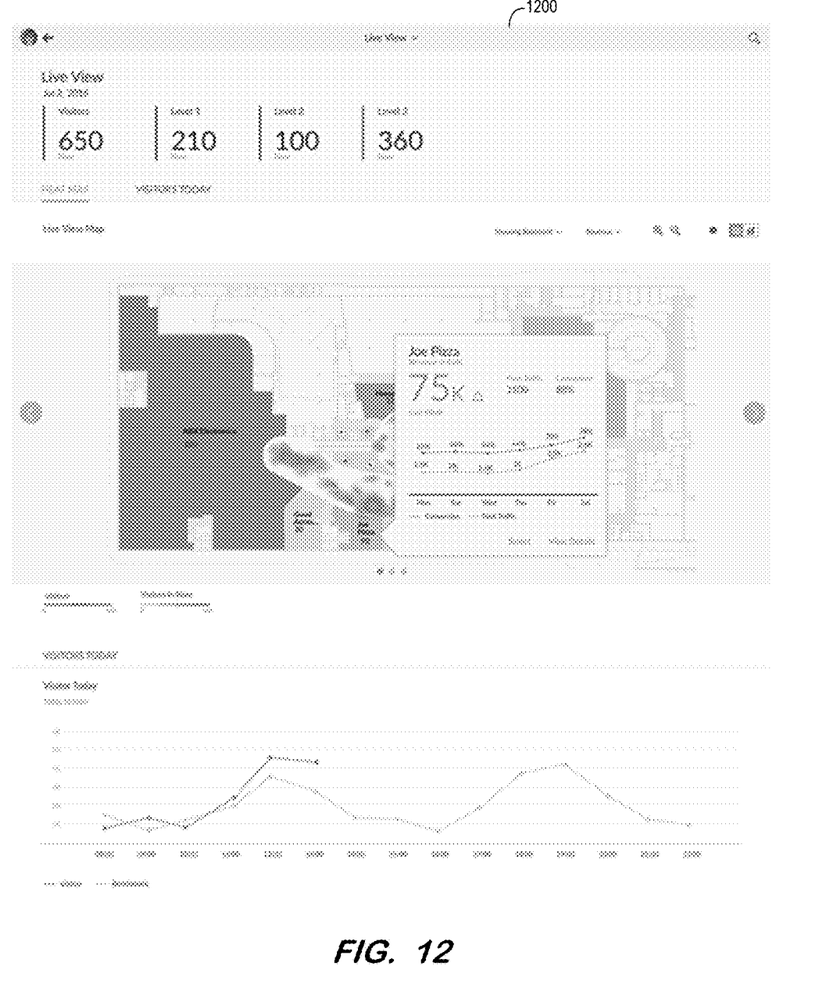
FIG. 12 is an outward view of a user interface according to some embodiments.
Figure 13:
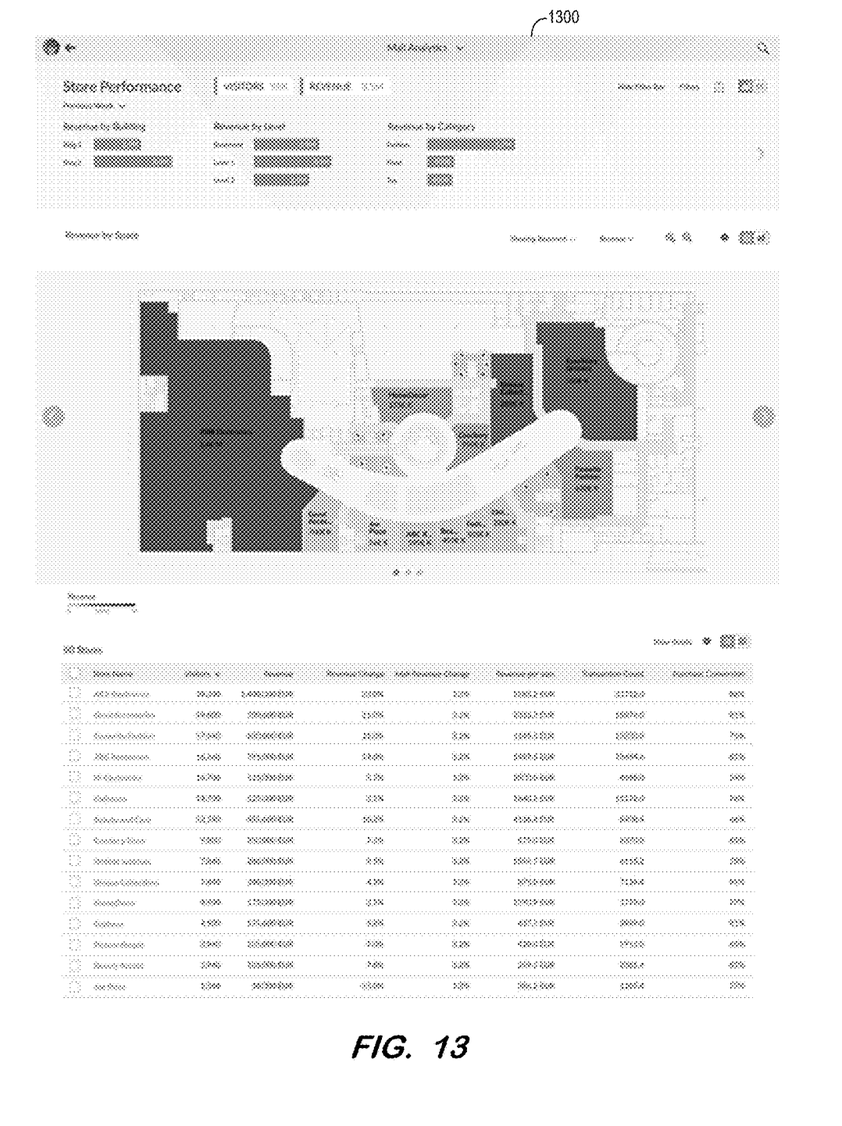
FIG. 13 is an outward view of a user interface according to some embodiments.

Interface 1200 of FIG. 12 shows multiple Things on a heatmap (Mall, Stores, public spaces) along with measure values (e.g., visitors, revenue) associated therewith as described herein. Similarly, store performance interface 1300 of FIG. 13 shows measure values for the physical spaces which are mapped to "Store" things. Spatially-related measure values such as visitors may be associated with other measure values such as store revenue in interfaces such as interface 1200 and 1300, thereby allowing for calculation of unique metrics such as 'PurchaseConversion', which may be a measure of a relation between revenue and number of visitors to a space/store.

Figure 14:
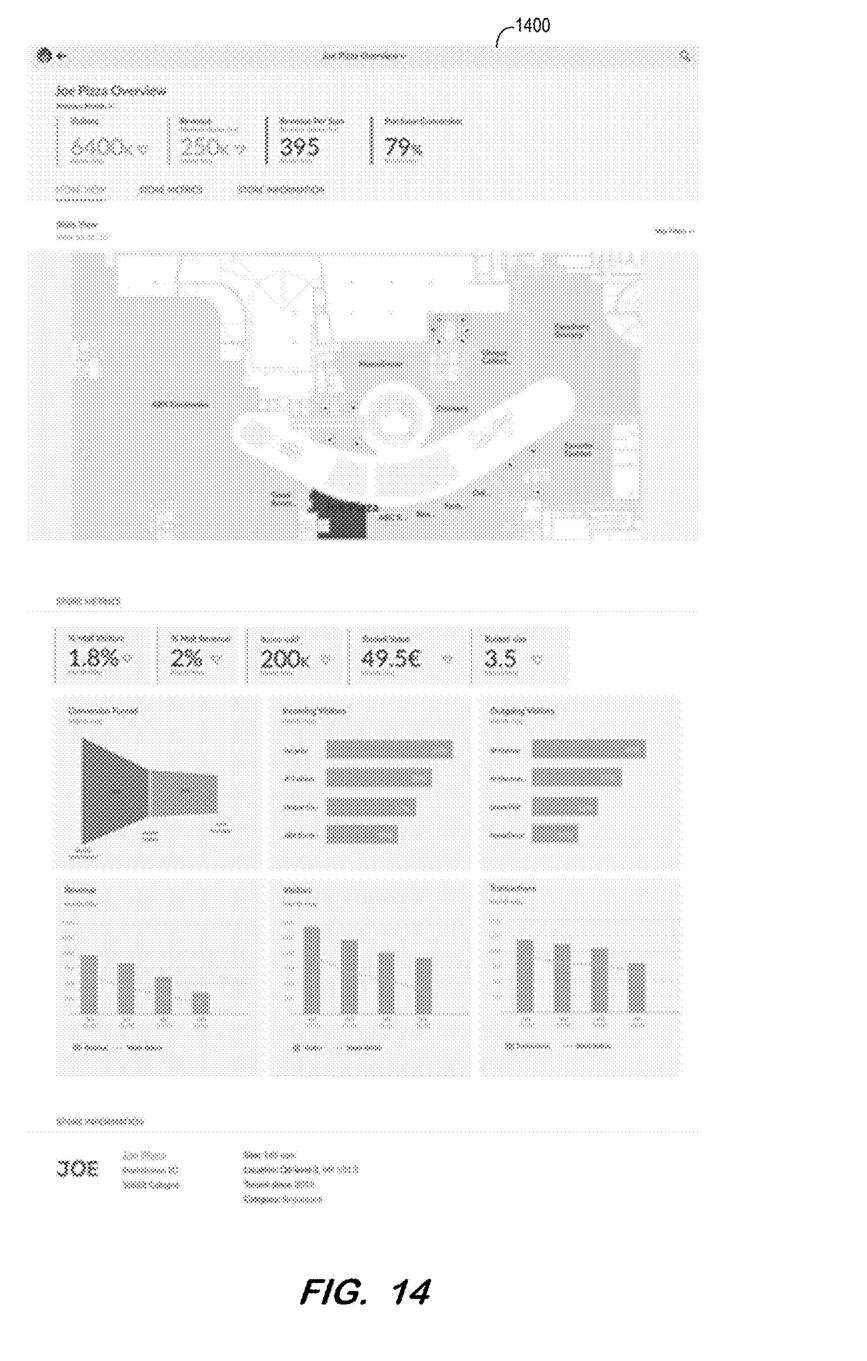
FIG. 14 is an outward view of a user interface according to some embodiments.

Interface 1400 of FIG. 14 provides examples of rich analytics which are provided due to thing assignments as described herein. For example, measure values associated with a first Thing (e.g., a Store) as described herein may be compared to measure values associated with a second Thing (e.g., a Mall). Also, a store's storefront, which itself is a Thing, may be used to calculate the illustrated conversion funnel.

Figure 15:
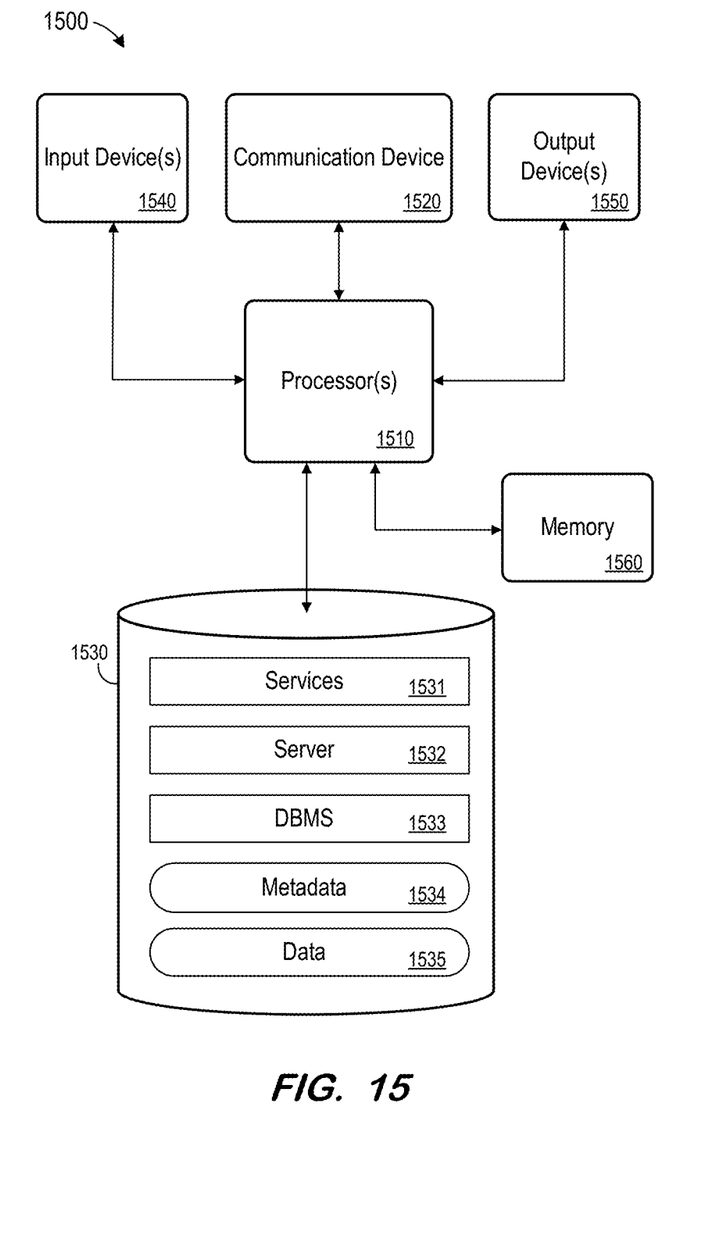
FIG. 15 is a block diagram of an apparatus according to some embodiments.

FIG. 15 is a block diagram of apparatus 1500 according to some embodiments. Apparatus 1500 may comprise a general-purpose computing apparatus and may execute program code to perform any of the functions described herein. Apparatus 1500 may comprise an implementation of server 130, DBMS 120 and data store 110 of FIG. 1 in some embodiments. Apparatus 1500 may include other unshown elements according to some embodiments.

Apparatus 1500 includes processor(s) 1510 operatively coupled to communication device 1520, data storage device 1530, one or more input devices 1540, one or more output devices 1550 and memory 1560. Communication device 1520 may facilitate communication with external devices, such as a reporting client, or a data storage device. Input device(s) 1540 may comprise, for example, a keyboard, a keypad, a mouse or other pointing device, a microphone, knob or a switch, an infra-red (IR) port, a docking station, and/or a touch screen. Input device(s) 1540 may be used, for example, to enter information into apparatus 1500. Output device(s) 1550 may comprise, for example, a display (e.g., a display screen) a speaker, and/or a printer.

Data storage device 1530 may comprise any appropriate persistent storage device, including combinations of magnetic storage devices (e.g., magnetic tape, hard disk drives and flash memory), optical storage devices, Read Only Memory (ROM) devices, etc., while memory 1560 may comprise Random Access Memory (RAM), Storage Class Memory (SCM) or any other fast-access memory.

Services 1531, server 1532 and DBMS 1533 may comprise program code executed by processor 1510 to cause apparatus 1500 to perform any one or more of the processes described herein. Embodiments are not limited to execution of these processes by a single apparatus.

Metadata 1534 and data 1535 (either cached or a full database) may be stored in volatile memory such as memory 1560. Metadata 1534 may include data model metadata, including but not limited to masterdata metadata and analytical data metadata, instances of which are stored in data 1535. Data storage device 1530 may also store data and other program code for providing additional functionality and/or which are necessary for operation of apparatus 1500, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a server including a processor to:
   determine a first measure value determined for a combination of dimension values associated with a first physical space tabular dimension value and a first time period tabular dimension value, each tabular dimension value residing in a data store;
   the determination of the first measure value and the first time period is based on stored analytical data conforming to an analytical data model;
   dynamically, at runtime, determine a time-dependent association between a first entity or first event and the first physical space during the first time period, the time-dependent association indicating a presence of the first entity or the first event within the first physical space;
   the determination of the time-dependent association between the first entity or first event and the first physical space is based on stored masterdata conforming to a masterdata data model; and
   dynamically, at runtime, map the first measure value to the first entity or first event based on the time-dependent association;
   output the first measure value in association with the first entity or first event; and
   a user device to:
   display an interface presenting a visualization of the first measure value in association with the first entity or first event.

2. The system according to claim 1, wherein a dimension of the first entity or first event is not associated with the measure of the first measure value in the analytical data model.

3. The system according to claim 2, the server further to:
   determine a second measure value associated with a first physical space and a second time period;
   dynamically, at runtime, determine a second time-dependent association between a second entity or second event and the first physical space; and
   dynamically, at runtime, map the second measure value to the second entity or second event based on the second time-dependent association; and
   output the second measure value in association with the second entity or second event,
   wherein the displayed interface presents the second measure value in association with the second entity or second event.

4. The system according to claim 1, the server further to:
   determine a second measure value associated with the first physical space and a second time period;
   dynamically, at runtime, determine a second time-dependent association between a second entity or event and the first physical space; and
   dynamically, at runtime, map the second measure value to the second entity or second event based on the second time-dependent association; and
   output the second measure value in association with the second entity or second event,
   wherein the displayed interface presents the second measure value in association with the second entity or second event.

5. The system according to claim 4, the server further to:
   determine a third measure value associated with a second physical space and the first time period;
   dynamically, at runtime, determine a third time-dependent association between a third entity third or event and the second physical space; and
   dynamically, at runtime, map the third measure value to the third entity or third event based on the third time-dependent association; and
   output the third measure value in association with the third entity or third event,
   wherein the displayed interface presents the third measure value in association with the third entity or third event.

6. A system comprising:
a metadata repository comprising first metadata defining an analytical data model and second metadata defining a masterdata data model;
a data store storing analytical data conforming to the analytical data model;
a memory containing processor-executable process steps; and
a processor to execute the processor-executable process steps to cause the system to:
determine a first measure value determined for a combination of dimension values associated with a first physical space tabular dimension value and a first time period tabular dimension value, each tabular dimension value within the analytical data;
the determination of the first measure value and the first time period is based on stored analytical data conforming to the analytical data model;
dynamically determine a time-dependent association between a first entity or first event and the first physical space during the first time period, the time-dependent association indicating a presence of the first entity or the first event within the first physical space;
the determination of the time-dependent association between the first entity or first event and the first physical space is based on stored masterdata conforming to the masterdata data model;
dynamically map the first measure value to the first entity or first event based on the time-dependent association; and
present a visualization of the first measure value in association with the first entity or first event.

7. The system according to claim 6, wherein a dimension of the first entity or event is not associated with the measure of the first measure value in the analytical data model.

8. The system according to claim 7, the processor to further execute processor-executable process steps to cause the system to:
determine a second measure value associated with a first physical space and a second time period within the analytical data;
dynamically determine a second time-dependent association between a second entity or event and the first physical space; and
dynamically map the second measure value to the second entity or event based on the second time-dependent association; and
present the second measure value in association with the second entity or event.

9. The system according to claim 6, the processor to further execute processor-executable process steps to cause the system to:
determine a second measure value associated with the first physical space and a second time period within the analytical data;
dynamically determine a second time-dependent association between a second entity or event and the first physical space; and
dynamically map the second measure value to the second entity or event based on the second time-dependent association; and
present the second measure value in association with the second entity or event.

10. The system according to claim 9, the processor to further execute processor-executable process steps to cause the system to:
determine a third measure value associated with a second physical space and the first time period within the analytical data;
dynamically determine a third time-dependent association between a third entity or third event and the second physical space; and
dynamically map the third measure value to the third entity or third event based on the third time-dependent association; and
present the third measure value in association with the third entity or third event.

11. A computer-implemented method comprising:
determining a first measure value determined for a combination of dimension values associated with a first physical space tabular dimension value and a first time period tabular dimension value, each tabular dimension value within analytical data conforming to an analytical data model;
the determination of the first measure value and the first time period is based on stored analytical data conforming to the analytical data model;
dynamically determining a time-dependent association between a first entity or first event and the first physical space during the first time period, the time-dependent association indicating a presence of the first entity or the first event within the first physical space;
the determination of the time-dependent association between the first entity or first event and the first physical space is based on stored masterdata conforming to a masterdata data model;
dynamically mapping the first measure value to the first entity or first event based on the time-dependent association; and
presenting a visualization of the first measure value in association with the first entity or first event.

12. The computer-implemented method according to claim 11, wherein a dimension of the first entity or first event is not associated with the measure of the first measure value in the analytical data model.

13. The computer-implemented method according to claim 12, further comprising:
determining a second measure value associated with a first physical space and a second time period within the analytical data;
dynamically determining a second time-dependent association between a second entity or second event and the first physical space; and
dynamically mapping the second measure value to the second entity or event based on the second time-dependent association; and
presenting the second measure value in association with the second entity or second event.

14. The computer-implemented method according to claim 11, further comprising:
determining a second measure value associated with the first physical space and a second time period within the analytical data;
dynamically determining a second time-dependent association between a second entity or second event and the first physical space; and
dynamically mapping the second measure value to the second entity or second event based on the second time-dependent association; and presenting the second measure value in association with the second entity or second event.

15. The computer-implemented method according to claim 14, further comprising:
   determining a third measure value associated with a second physical space and the first time period within the analytical data;
   dynamically determining a third time-dependent association between a third entity or third event and the second physical space; and
   dynamically mapping the third measure value to the third entity or third event based on the third time-dependent association; and
   presenting the third measure value in association with the third entity or third event.

16. A non-transitory computer-readable medium having stored thereon executable instructions when executed by a processor unit cause the processor unit to perform a method, the method comprising:
   determining a first measure value determined for a combination of dimension values associated with a first physical space tabular dimension value and a first time period tabular dimension value, each tabular dimension value within analytical data conforming to an analytical data model;
   the determination of the first measure value and the first time period is based on stored analytical data conforming to the analytical data model;
   dynamically determining a time-dependent association between a first entity or first event and the first physical space during the first time period, the time-dependent association indicating a presence of the first entity or the first event within the first physical space;
   the determination of the time-dependent association between the first entity or first event and the first physical space is based on stored masterdata conforming to a masterdata data model;
   dynamically mapping the first measure value to the first entity or first event based on the time-dependent association; and
   presenting a visualization of the first measure value in association with the first entity or first event.

17. The non-transitory computer-readable medium of claim 16, the executable instructions further configured to cause the processor unit to perform the method, wherein a dimension of the first entity or first event is not associated with the measure of the first measure value in the analytical data model.

18. The non-transitory computer-readable medium of claim 17, the executable instructions further configured to cause the processor unit to perform the method, further comprising:
   determining a second measure value associated with a first physical space and a second time period within the analytical data;
   dynamically determining a second time-dependent association between a second entity or second event and the first physical space; and
   dynamically mapping the second measure value to the second entity or event based on the second time-dependent association; and
   presenting the second measure value in association with the second entity or second event.

19. The non-transitory computer-readable medium of claim 16, the executable instructions further configured to cause the processor unit to perform the method, further comprising:
   determining a second measure value associated with the first physical space and a second time period within the analytical data;
   dynamically determining a second time-dependent association between a second entity or second event and the first physical space; and
   dynamically mapping the second measure value to the second entity or second event based on the second time-dependent association; and
   presenting the second measure value in association with the second entity or second event.

20. The non-transitory computer-readable medium of claim 19, the executable instructions further configured to cause the processor unit to perform the method, further comprising:
   determining a third measure value associated with a second physical space and the first time period within the analytical data;
   dynamically determining a third time-dependent association between a third entity or third event and the second physical space; and
   dynamically mapping the third measure value to the third entity or third event based on the third time-dependent association; and
   presenting the third measure value in association with the third entity or third event.

* * * * *